(12) United States Patent
Everingham et al.

(10) Patent No.: US 8,275,115 B1
(45) Date of Patent: Sep. 25, 2012

(54) SYSTEM AND METHOD FOR SECURING DATA EXCHANGED DURING A TELEPHONE CALL

(75) Inventors: James Everingham, Aptos, CA (US); Lloyd William Tabb, Santa Cruz, CA (US)

(73) Assignee: Live Ops, Inc., Santa Clara, CA (US)

( * ) Notice: Subject to any disclaimer, the term of this patent is extended or adjusted under 35 U.S.C. 154(b) by 1625 days.

(21) Appl. No.: 10/963,236

(22) Filed: Oct. 12, 2004

(51) Int. Cl.
*H04M 3/00* (2006.01)

(52) U.S. Cl. .......... 379/265.02; 379/265.01; 379/266.01

(58) Field of Classification Search .......... 379/265.01–265.02, 266.01
See application file for complete search history.

(56) References Cited

U.S. PATENT DOCUMENTS

| | | | |
|---|---|---|---|
| 4,792,968 A | 12/1988 | Katz | |
| 4,989,233 A | 1/1991 | Schakowsky et al. | |
| 5,825,856 A | 10/1998 | Porter et al. | |
| 6,320,956 B1 | 11/2001 | Cherry et al. | |
| 6,401,066 B1 | 6/2002 | McIntosh | |
| 6,862,343 B1 | 3/2005 | Vacek et al. | |
| 7,426,268 B2 * | 9/2008 | Walker et al. ............ | 379/266.01 |
| 7,725,943 B2 | 5/2010 | Shannon et al. | |
| 2002/0038286 A1 * | 3/2002 | Koren et al. ............ | 705/40 |
| 2006/0242695 A1 * | 10/2006 | Nedeltchev et al. ........ | 726/15 |
| 2007/0035390 A1 | 2/2007 | Thomas et al. | |

OTHER PUBLICATIONS

U.S. Appl. No. 10/886,333, filed Jun. 5, 2008, Everingham et al.
U.S. Appl. No. 12/589,832, mailed Nov. 22, 2011, Apparao et al.

* cited by examiner

*Primary Examiner* — Rasha Al Aubaidi
(74) *Attorney, Agent, or Firm* — Patent Esque Law Group, LLP

(57) ABSTRACT

A system and method for receiving information from a caller without the information being accessed by an agent handling the call. A call is received and routed to an agent, who may be remote. When predetermined information (e.g., credit card number, social security number) is to be provided by the caller, an IVR (Interactive Voice Response) unit or media server is bridged into the call. The caller's input is received by the IVR unit, but not by the agent. If the information is entered as DTMF tones, those tones may be muted or altered for the agent. The agent's voice connection may remain open, however, to receive and answer questions from the caller. If the information is provided verbally, the audio connection to the agent may be muted. The agent is signaled when the information is complete, at which time the IVR unit is disconnected and the call proceeds normally.

68 Claims, 2 Drawing Sheets

SYSTEM AND METHOD FOR SECURING DATA EXCHANGED DURING A TELEPHONE CALL

BACKGROUND

This invention relates to the field of electronic communications. More particularly, a system and methods are provided for protecting information provided during a telephone call.

Many types of personal or sensitive data are exchanged during telephone calls. For example, a caller seeking to purchase a good or service is often required to provide a credit card number, other financial data, a social security number or other information for identifying the caller or a source of funds for the purchase. Such information is almost always provided to a human agent, and that agent may steal it or fail to protect it adequately.

One method of trying to prevent the theft or loss of sensitive information received during a telephone call is to place agents in monitored areas and deny them access to writing implements. However, this does not prevent an agent from remembering a caller's information and transcribing it after leaving the area. And, some agents do not or cannot work in such areas—such as agents working from their homes.

Therefore, there is a need for a system and a method for protecting sensitive information transmitted or passed during a telephone call, to prevent it from being misappropriated by an agent.

SUMMARY

In one embodiment of the invention, a system and methods are provided for receiving information from a caller without the information being accessed by an agent handling the call. A call is received and routed to an agent who may be remote. When predetermined information (e.g., credit card number, social security number) is to be provided by the caller, an IVR (Interactive Voice Response) unit or media server is bridged or trunked into the call, without the call being dropped. The caller's information input is received by the IVR unit, but not by the agent.

In one embodiment of the invention the information is entered as DTMF (Dual-Tone Multi-Frequency) tones, and those tones may be muted or altered for the agent. For example, the same tone may be played for each digit entered by the caller. The agent's voice connection may remain open, however, to receive and answer questions from the caller.

In another embodiment of the invention, the information is provided verbally and the caller's audio connection to the agent may be muted. The agent may still be able to speak to the caller, possibly to prompt the caller to speak or repeat the information, or to confirm to the caller that the information was received.

The agent is signaled when the information is complete, at which time the IVR unit is disconnected and the call may proceed normally.

DETAILED DESCRIPTION

Figure 1:
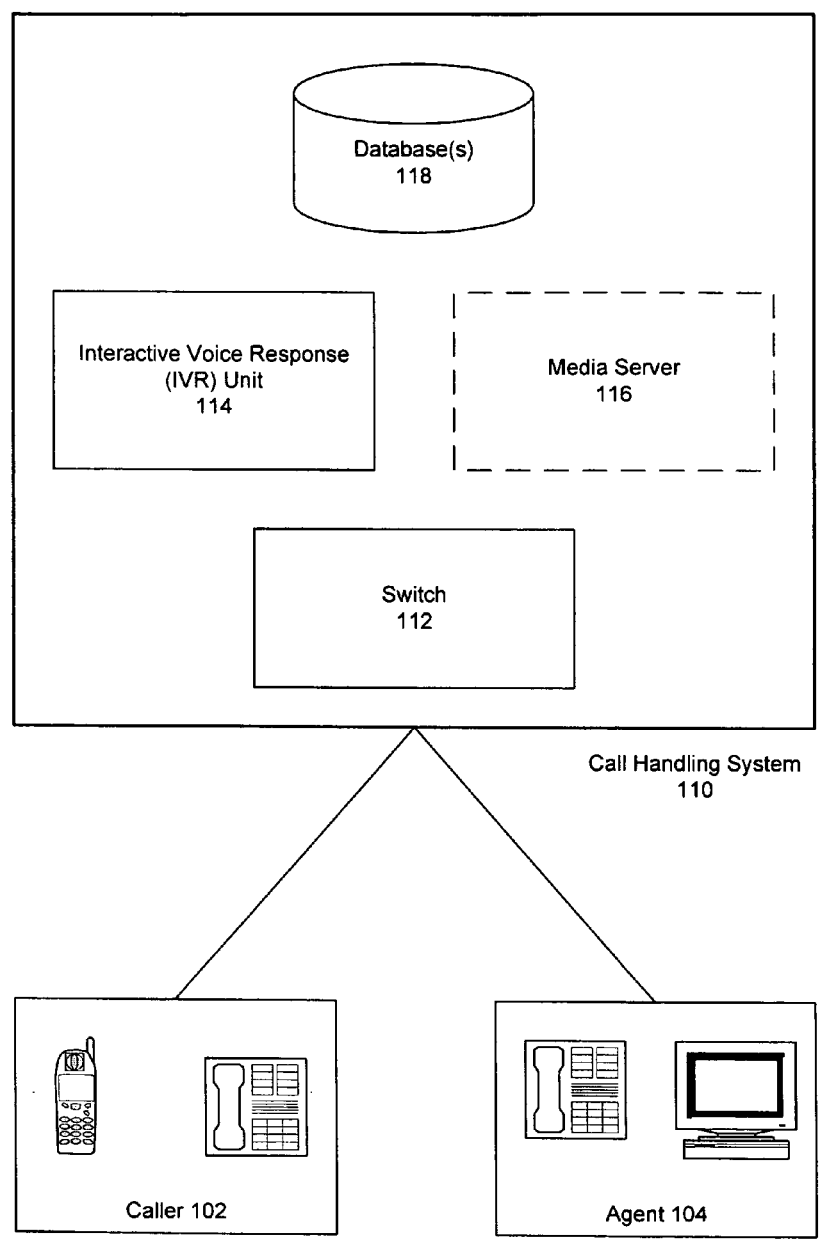
FIG. 1 is a block diagram depicting a system for protecting information exchanged during a telephone call, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and a method are provided for protecting information provided during a telephone call. The information is provided by a caller seeking a good or service, and may include the caller's credit card number, other financial account identifier, social security number, etc. In other embodiments of the invention, other types of information may be protected, belonging to a party to the telephone call or some other party.

In an embodiment of the invention, a caller seeking a good or service is connected to a human agent and the call is handled normally until the personal or sensitive information to be protected needs to be exchanged. At that point, an interactive voice response (IVR) unit is branched into the call, without dropping the original call, and the transmission of the information is received by the IVR. The agent may receive a muted or altered version of the input, or just silence. Thus, instead of having the agent receive the information, or disconnecting the agent while some other entity receives the information, the caller is connected to both the agent and the IVR while providing the information but the agent does not receive it.

In different implementations, the caller may provide her information verbally or through DTMF (Dual Tone Multi Frequency) by pressing buttons on her telephone keypad. The caller may be prompted to enter the information by the agent or by an IVR.

If the caller's information is entered via DTMF, on the call leg connected to the agent the tones may be muted, changed or substituted. The caller may hear the input, but the agent may hear no tones, a series of identical tones or a sequence of random or other tones.

Advantageously, the caller may be able to talk to the agent even while making the DTMF input, perhaps to ask how to enter the information. The voice connection between the caller and agent may therefore remain open throughout the caller's input, or may be silenced until or unless the caller enters a special key sequence (e.g., "#" or "*") to bring the agent back online.

If the caller's information is provided verbally, the input may be muted to the agent while it is recorded by the IVR. The call leg to the agent may be silenced until the caller enters a particular key sequence or until some period of time passes.

The agent's voice connection to the caller may remain open, regardless of how the user enters his or her information. Illustratively, this lets the agent tell the caller when to send the information, and allows the agent to tell the caller that the information has been received. The agent may receive some visual indication as the caller enters his or her information and/or after the caller finishes entering the information on a video or computer display. For example, a sequence of Xs or other characters may appear as DTMF tones are received and decoded by an IVR.

FIG. 1 is a block diagram of a system for securely receiving a caller's information, according to one embodiment of the invention. In this embodiment, call handling system 110 may be operated by an organization separate from agent 104, or agent 104 may be part of the same organization.

Call handling system 110 includes switch 112, IVR (Interactive Voice Response) unit 114, media server 116 and one or more databases 118. Any or all of the elements of system 110 may be omitted in alternative embodiments of the invention, or merged with or separated from other elements.

Switch 112 is configured to establish and terminate call legs between various entities. For example, in one method of the invention, caller 102 calls a telephone number associated with call handling system 110, and the call is received by the switch. Switch 112 will establish a call leg to agent 104 and, as necessary, bridge in other entities such as IVR unit 114 and media server 116.

IVR unit 114 may comprise hardware and/or software for playing messages (e.g., audio) for callers and for receiving information from them. An IVR may be configured for multiple tasks, or separate IVR units or instances may be configured for different tasks (e.g., to play different messages, to receive different information).

Media server 116 is an optional component of system 110. In the illustrated embodiment of the invention the media server is configured to control the handling and flow of a call. For example, media server 116 may be configured to instruct an IVR unit to play a particular message, receive data from a caller (e.g., DTMF tones), mix or bridge calls, prompt an agent to begin (or continue) a call handling script, etc. In one embodiment of the invention IVR unit 114 comprises media server 116, or vice versa.

Databases 118 may include secure and/or unsecured databases. Some uses of the databases may be to store things such as: sensitive information provided by a caller, recordings of whole or partial calls, call handling scripts for agents, audio messages to be played by IVR unit 114, etc.

Caller 102 employs any type or types of telephones, including a computer system for VOIP (Voice Over Internet Protocol) calls. Agent 104 also uses any type of telephone device, and also uses a computer system. The agent's computer system may facilitate the execution of a call handling script, allow the agent to be prompted (e.g., by media server 116 or IVR unit 114) to take some action, chat with another agent or a member of the organization operating system 110, and/or other purposes.

Figure 2:
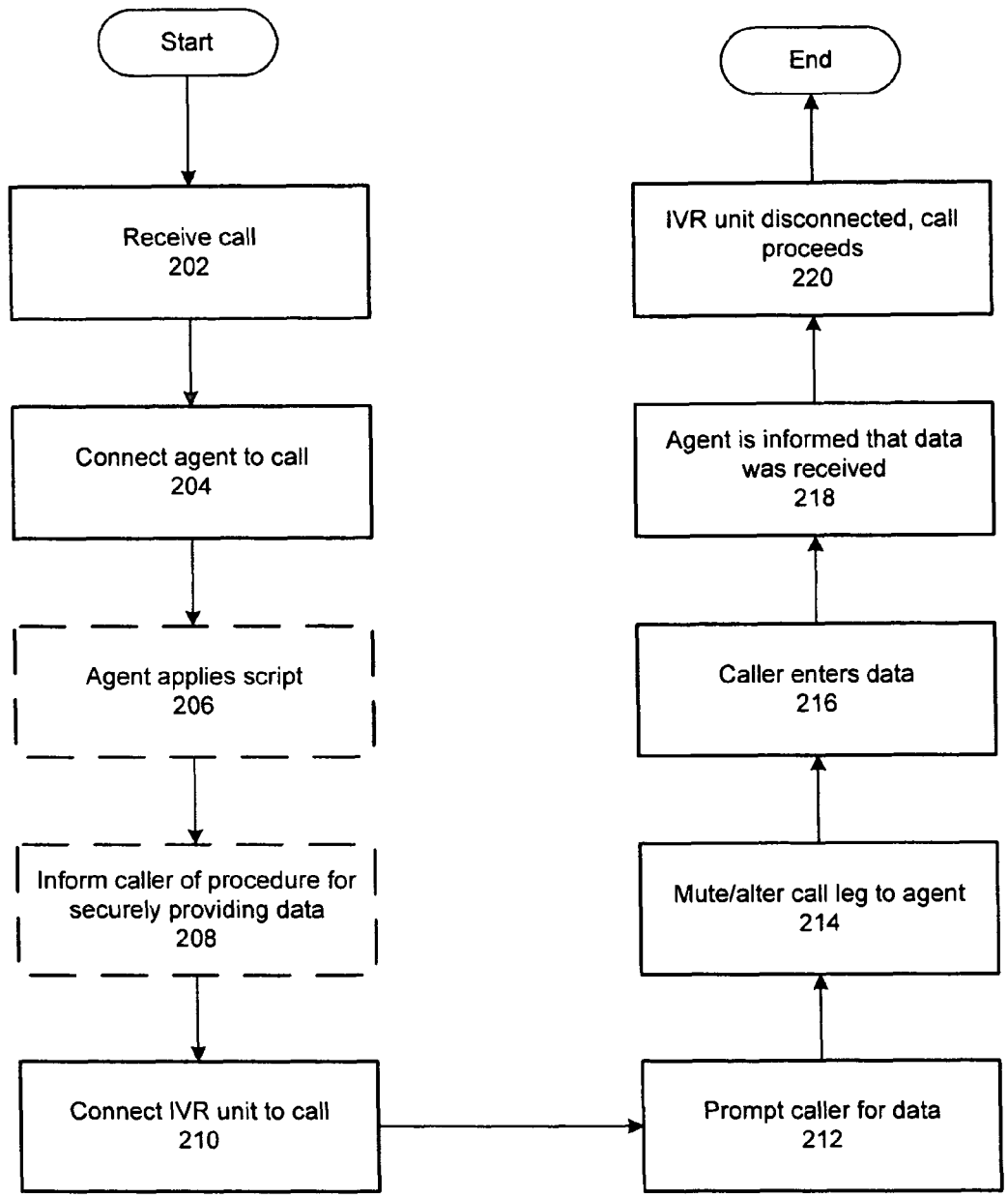
FIG. 2 is a flowchart illustrating one method of protecting information exchanged during a telephone call, in accordance with an embodiment of the invention.

FIG. 2 demonstrates a method of securing data passed during a telephone call, according to one embodiment of the invention. The illustrated method may be implemented on a system or apparatus similar to, or suggested by, call handling system 110 of FIG. 1.

In operation 202, a call is received at a call handling system. Illustratively, the call may be received at number associated with a particular good or service being offered for sale.

In operation 204 an agent is connected to the call. As depicted in FIG. 1, the initial call may be routed to a switch; from there a call leg may be established with an agent that is local to or remote from the call handling system. As part of operation 204, recording of the call may begin if a whole or partial record of the call is desired.

In optional operation 206, the agent applies a script for handling the call. Illustratively, the agent operates a computer system that executes the script to prompt the agent as to how to handle the call. In other embodiments of the invention the agent need not follow a predetermined script.

In optional operation 208, in advance of obtaining sensitive information from the caller (e.g., social security number, bank account or credit card number), the caller may be informed of some details of the process by which the information will be received. For example, the caller may be informed (by the agent or an IVR module) that the information should be entered by pressing the corresponding telephone keys (or by speaking the information) and that the agent will not receive (or hear) the information.

In operation 210, an IVR unit is connected to the call (if not already connected). Illustratively, a separate call leg may be established from the switch to the IVR unit, the IVR unit may be bridged onto the agent's call leg or the caller's connection may be moved from a switch to the IVR unit. The agent remains connected to the call.

Connection of the IVR unit and the action needed to securely capture the user's sensitive information may be initiated when the agent makes a predetermined input on his or her computer system. In this embodiment of the invention, the script that the agent follows prompts him or her to make the input at the appropriate time.

In operation 212 the caller is prompted for the sensitive information by the agent or by the IVR unit. In one implementation, the voice connection from the agent to the caller is unaffected and therefore the agent may verbally instruct the caller to enter or speak the information. In another implementation, the IVR unit may play a message asking the user to provide the information.

In operation 214, the call leg to the agent is muted or altered to prevent the agent from receiving the information when it is provided. For example, if the caller is providing the information verbally, the audio connection to the agent may be silenced. If the information is being provided via DTMF tones, those tones may be altered or masked but the connection may be otherwise unaffected.

In operation 216, the caller enters her information by pressing the appropriate telephone buttons or by speaking the information. If provided verbally, the information may be recorded for automatic or manual transcription, or may be automatically transcribed in real time. The caller may be asked to repeat her input.

In one implementation, if the caller is entering the information with DTMF tones, she can still talk to the agent. Therefore, if she makes an error and needs to restart, or is unsure how to enter the information, she can ask the agent. In another implementation, the caller may be able to press a particular key or key sequence to re-open her voice connection to the agent.

The system may automatically recognize when the user's input is complete, based on the number of digits pressed or spoken, based on the passage of a predetermined period of time, or after the caller presses a particular key or sequence of keys to indicate that her input is complete.

The data provided by the caller may be repeated back to the caller automatically or if the caller requests. The data may also be error-checked or validated. For example, the number of digits may be compared with the number that is expected. In addition, a proffered credit card number may be verified as being valid.

In operation 218, the agent is informed (e.g., by the IVR unit) that the caller's data has been received. Illustratively, this notification may be performed audibly or via the agent's computer system.

In operation 220, the IVR unit is disconnected from the call and the call proceeds or terminates normally. The IVR unit may be disconnected automatically, or only when the agent makes another input on his computer system. If the caller's connection was moved from a switch to the IVR unit when it was bridged into the call, the connection may be moved back to the switch.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of securely receiving information provided by a caller during a telephone call with a call handling agent, the method comprising:
   receiving at a call handling system a call from the caller;
   routing the call to an agent remote from the call handling system, wherein the agent is equipped with a computing device;
   initiating a call handling script on the computing device;
   receiving from the agent a signal to initiate secure receipt of information from the caller;
   bridging an interactive voice response (IVR) unit onto the call;
   receiving the information from the caller at the IVR unit but not at the agent;
   validating the information received from the caller; and
   notifying the agent that the information was received.

2. The method of claim 1, wherein said initiating comprises transmitting the script to the computing device from the call handling system.

3. The method of claim 1, wherein said initiating comprises triggering, by the call handling system, execution of the script on the computing device.

4. The method of claim 1, wherein said routing comprises bridging a call leg to the agent onto the call from the caller.

5. The method of claim 1, wherein said signal is received via the computing device.

6. The method of claim 1, wherein said receiving comprises:
   enabling the caller and the agent to converse while the information is received at the IVR unit.

7. The method of claim 1, wherein the information is received as a sequence of Dual-Tone Multi-Frequency (DTMF) tones, and wherein said receiving comprises:
   altering said tones before said tones are received by the agent.

8. The method of claim 7, wherein the altering is performed by the IVR unit.

9. The method of claim 1, wherein said receiving comprises:
   muting the call connection to the agent.

10. The method of claim 9, wherein the muting is performed by the IVR unit.

11. The method of claim 1, wherein said notifying comprises:
    transmitting a notification to the computing device.

12. The method of claim 1, wherein the agent is a human.

13. The method of claim 1, further comprising:
    storing the information in a secure database; and
    storing other information of the caller received by the agent in an unsecured database, separate from the secure database.

14. The method of claim 1, further comprising:
    storing a first recording containing sensitive information of the caller in a secure database; and
    storing a second recording containing non-sensitive information of the caller in an unsecured database, separate from the secure database.

15. The method of claim 1, further comprising:
    exchanging information between the caller and the agent through the IVR unit.

16. The method of claim 15, wherein the exchanging includes enabling the agent to participate while the information is being received at the IVR unit.

17. The method of claim 1, wherein the agent is enabled to control an experience of the caller during the call through the IVR unit.

18. The method of claim 1, further comprising:
    exchanging information between the caller and the IVR unit.

19. The method of claim 18, wherein the exchanging includes enabling the IVR unit to communicate information to the caller.

20. The method of claim 18, wherein the exchanging includes enabling the IVR unit to play a message to the caller.

21. The method of claim 18, wherein the exchanging includes enabling the IVR unit to repeat the information back to the caller.

22. The method of claim 1, wherein the caller is enabled to interrupt the process of receiving the information.

23. A non-transitory computer readable storage medium storing instructions that, when executed by a computer, cause the computer to perform a method of securely receiving information provided by a caller during a telephone call with a call handling agent, the method comprising:
    receiving at a call handling system a call from the caller;
    routing the call to an agent remote from the call handling system, wherein the agent is equipped with a computing device;
    initiating a call handling script on the computing device;
    receiving from the agent a signal to initiate secure receipt of information from the caller;
    bridging an interactive voice response (IVR) unit onto the call;
    receiving the information from the caller at the IVR unit but not at the agent;
    validating the information received from the caller; and
    notifying the agent that the information was received.

24. A method of securely receiving information transmitted during a telephone call, the method comprising:
    receiving a telephone call from a caller;
    connecting an agent to the call;
    prior to transmission of predetermined information from the caller, connecting a voice response unit to the call to initiate a secure receipt of the predetermined information without disconnecting the agent;
    receiving the predetermined information from the caller at the voice response unit; and preventing the agent from receiving the predetermined information.

25. The method of claim 24, wherein said preventing comprises:
muting the received predetermined information on the agent connection to the call.

26. The method of claim 25, wherein the muting is performed by the voice response unit.

27. The method of claim 24, wherein said preventing comprises:
masking the received predetermined information on the agent connection to the call.

28. The method of claim 27, wherein the masking is performed by the voice response unit.

29. The method of claim 24, wherein said preventing comprises:
altering the received predetermined information on the agent connection to the call.

30. The method of claim 29, wherein the altering is performed by the voice response unit.

31. The method of claim 24, wherein said receiving comprises:
receiving DTMF (Dual-Tone Multi-Frequency) tones corresponding to the predetermined information.

32. The method of claim 31, wherein said preventing comprises:
altering the DTMF tones on the agent connection to the call.

33. The method of claim 31, wherein said preventing comprises:
enabling the agent to converse with the caller.

34. The method of claim 24, further comprising, during receipt of the predetermined information from the caller:
enabling the caller to converse with the agent.

35. The method of claim 24, wherein said receiving comprises:
receiving verbal input of the predetermined information.

36. The method of claim 35, wherein said preventing comprises:
muting the verbal input on the agent connection to the call.

37. The method of claim 24, further comprising:
acknowledging to the caller receipt of the predetermined information.

38. The method of claim 24, further comprising:
notifying the agent of receipt of the predetermined information.

39. The method of claim 38, wherein said notifying comprises generating, for the agent, visual confirmation of receipt of the predetermined information.

40. The method of claim 24, further comprising:
storing the predetermined information in a secure database; and
storing other information of the caller received by the agent in an unsecured database, separate from the secure database.

41. The method of claim 24, further comprising:
storing a first recording containing the predetermined information of the caller in a secure database; and
storing a second recording containing other information of the caller in an unsecured database, separate from the secure database.

42. The method of claim 24, further comprising:
exchanging information between the caller and the agent through the voice response unit.

43. The method of claim 42, wherein the exchanging includes enabling the agent to participate while the predetermined information is being received at the voice response unit.

44. The method of claim 24, wherein the agent is enabled to control an experience of the caller during the call through the voice response unit.

45. The method of claim 24, further comprising:
exchanging information between the caller and the voice response unit.

46. The method of claim 45, wherein the exchanging includes enabling the voice response unit to communicate information to the caller.

47. The method of claim 45, wherein the exchanging includes enabling the voice response unit to play a message to the caller.

48. The method of claim 24, wherein the caller is enabled to interrupt the process of receiving the predetermined information.

49. The method of claim 45, wherein the exchanging includes enabling the voice response unit to repeat the predetermined information back to the caller.

50. A non-transitory computer readable storage medium storing instructions that, when executed by a computer, cause the computer to perform a method of securely receiving information transmitted during a telephone call, the method comprising:
receiving a telephone call from a caller;
connecting an agent to the call;
prior to transmission of predetermined information from the caller, connecting a voice response unit to the call to initiate a secure receipt of the predetermined information without disconnecting the agent;
receiving the predetermined information from the caller at the voice response unit; and
preventing the agent from receiving the predetermined information.

51. An apparatus for securely receiving information transmitted during a telephone call, comprising:
a call switch configured to:
receive a call from a caller;
connect an agent to the call; and
connect an interactive voice response (IVR) unit to the call to initiate a secure receipt of the predetermined information without
disconnecting the agent;
the IVR unit being configured to:
receive information from a caller during a telephone call; and
prevent the agent from receiving a portion of the information.

52. The apparatus of claim 51, wherein said IVR unit is further configured to received Dual-Tone Multi-Frequency (DTMF) tones from the caller.

53. The apparatus of claim 52, wherein:
the portion of information is received as a sequence of DTMF tones; and
said IVR unit prevents the agent from receiving the portion of information by altering the sequence of DTMF tones.

54. The apparatus of claim 53, wherein said IVR unit alters the sequence of DTMF tones by muting the DTMF tones.

55. The apparatus of claim 53, wherein said IVR unit alters the sequence of DTMF tones by replacing the DTMF tones.

56. The apparatus of claim 51, wherein said IVR unit comprises a media server.

57. The apparatus of claim 51, wherein:
the portion of information is received verbally from the caller; and
said IVR unit prevents the agent from receiving the portion of information by muting a voice portion of the connection to the agent.

58. The apparatus of claim 51, wherein said IVR unit is further configured to prompt the agent after the portion of information is received.

59. The apparatus of claim 51, further comprising:
a secure database configured to store the portion of information; and
an unsecured database, separate from the secure database, configured to store other information of the caller received by the agent.

60. The apparatus of claim 51, further comprising:
a secure database configured to store a first recording containing sensitive information of the caller; and
an unsecured database, separate from the secure database, configured to store a second recording containing non-sensitive information of the caller.

61. The apparatus of claim 51, wherein the IVR unit is further configured to:
facilitate an exchange of information between the caller and the agent.

62. The apparatus of claim 61, wherein the exchange includes enabling the agent to participate while the information is being received at the IVR unit.

63. The apparatus of claim 51, wherein the IVR unit is further configured to:
enable the agent to control an experience of the caller during the call.

64. The apparatus of claim 51, wherein the IVR unit is further configured to:
exchange information with the caller.

65. The apparatus of claim 64, wherein the exchange includes communicating information to the caller.

66. The apparatus of claim 64, wherein the exchange includes playing a message to the caller.

67. The apparatus of claim 64, wherein the exchange includes repeating information back to the caller.

68. The apparatus of claim 51, wherein the IVR unit is further configured to:
enable the caller to interrupt the process of receiving the portion of information.

* * * * *